(12) United States Patent
Yono et al.

(10) Patent No.: US 7,914,686 B2
(45) Date of Patent: Mar. 29, 2011

(54) ELECTRODE SYSTEM FOR ELECTROKINETIC FLOATATION OF PAINT SLUDGE USING LOW VOLTAGE DC CURRENT

(75) Inventors: Faiz Yono, West Bloomfield, MI (US); Julie Q Shang, London (CA); Gary George, Oxford, MI (US); Shelley Sullivan, Kirkwood, MI (US); Mitra S Sioshansi, Rochester, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1562 days.

(21) Appl. No.: 11/252,494

(22) Filed: Oct. 18, 2005

(65) Prior Publication Data

US 2007/0084799 A1      Apr. 19, 2007

(51) Int. Cl.
*C02F 1/465* (2006.01)

(52) U.S. Cl. .......... 210/703; 210/707; 210/748.17; 210/221.2; 205/757; 204/263; 204/570

(58) Field of Classification Search .......... 210/703, 210/707, 748.17, 221.2; 205/757; 204/263, 204/570
See application file for complete search history.

(56) References Cited

U.S. PATENT DOCUMENTS

| | | | |
|---|---|---|---|
| 4,563,274 A * | 1/1986 | Rothon et al. | 210/101 |
| 4,610,785 A * | 9/1986 | Russell | 210/195.1 |
| 5,244,573 A * | 9/1993 | Horisawa | 210/519 |
| 5,370,792 A * | 12/1994 | Bhatnagar et al. | 210/167.01 |
| 5,380,417 A * | 1/1995 | Essop et al. | 204/269 |
| 5,858,199 A | 1/1999 | Hanak | |
| 6,255,551 B1 | 7/2001 | Shapiro et al. | |
| 6,800,206 B2 * | 10/2004 | Robinson | 210/746 |

* cited by examiner

*Primary Examiner* — Thomas M Lithgow
(74) *Attorney, Agent, or Firm* — Ralph E. Smith

(57) ABSTRACT

A process using an electrical signal for electrokinetic floatation of solids and semi-solids in paint sludge water includes collecting the paint sludge water into a tank. The process further includes generating the electrical signal from a bottom of the tank to separate the solids and semi-solids from the water in the paint sludge water to induce electrokinetic floatation of the solids and semi-solids to a top surface in the tank. After separating the solids and semi-solids from the water, the process includes removing the solids and semi-solids from the tank.

19 Claims, 3 Drawing Sheets

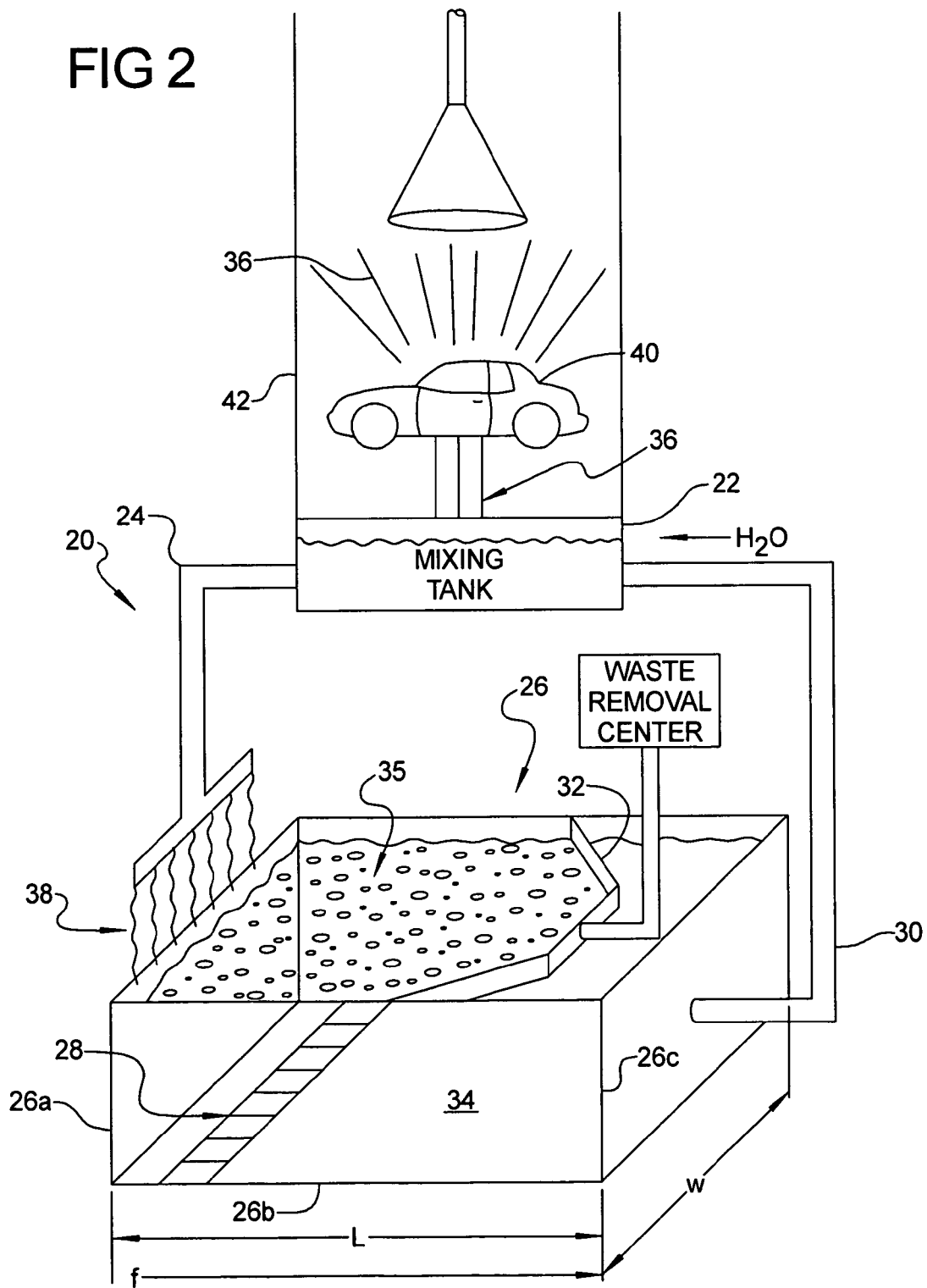

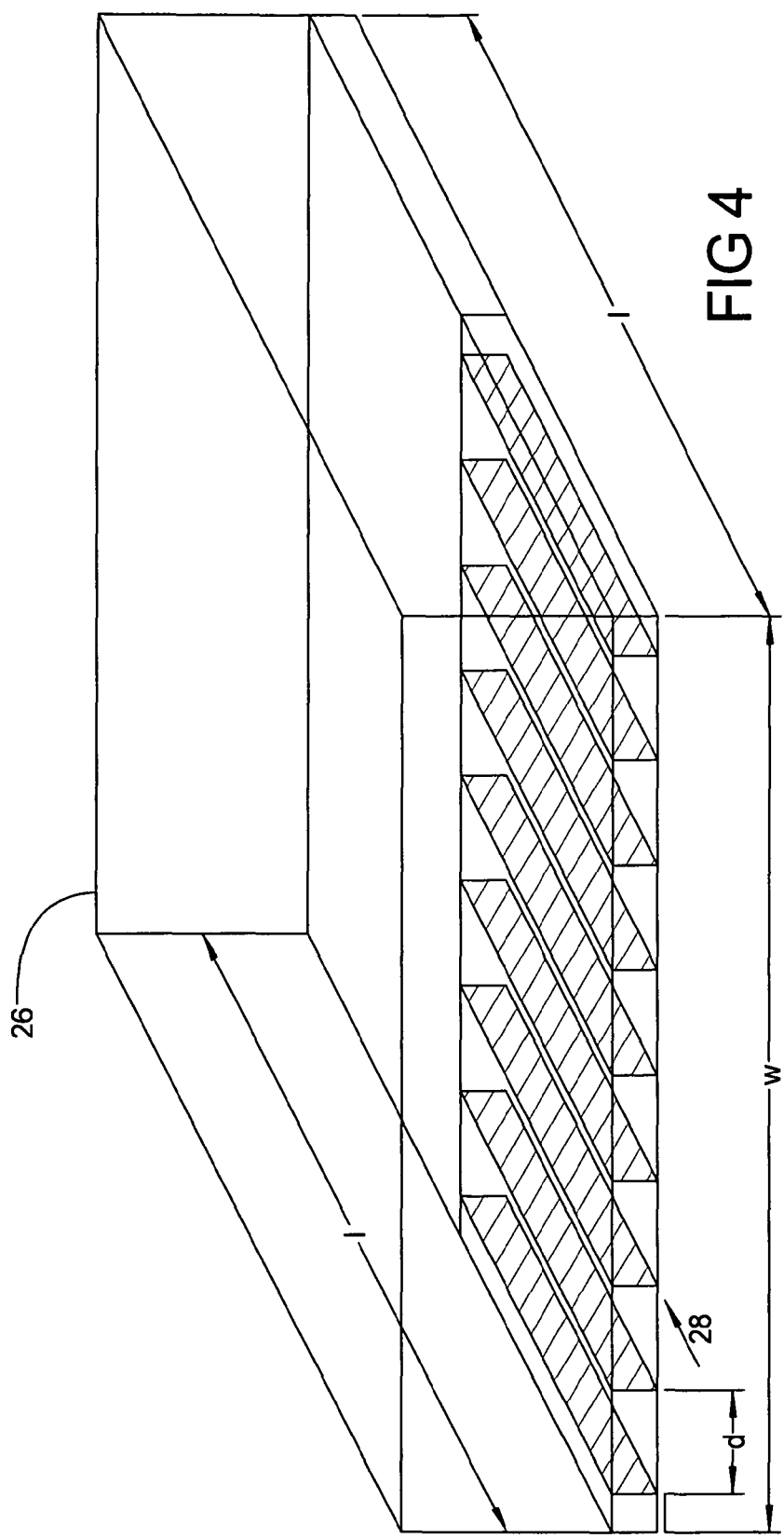

ELECTRODE SYSTEM FOR ELECTROKINETIC FLOATATION OF PAINT SLUDGE USING LOW VOLTAGE DC CURRENT

FIELD OF THE INVENTION

The present invention relates generally to paint sludge generated from painting vehicles. More specifically, the present invention relates to a process and a system for removing paint sludge from water.

BACKGROUND OF THE INVENTION

When a vehicle is painted, excess paint is often captured in a trough filled with water circulating in a channel located beneath the vehicle. The water collects excess paint that is suspended as small particles of solids and semi-solids, also known as paint sludge. The water and the solids and semi-solids form a substance commonly referred to as paint sludge water. The paint sludge water is then pumped into a tank or container (commonly referred to as a sludge pit), where chemicals are added to lift as much of the solid and semi-solids as possible from the water. Next, the solids and semi-solids are removed from the water and disposed.

In an effort to reduce cost and the amount of chemicals used to remove the solids and semi-solids from the water, an alternative process and system is needed to separate and remove the solid and semi-solids from the water.

SUMMARY OF THE INVENTION

In accordance with the present invention, a process for using an electrical signal to generate electrokinetic floatation of solids and semi-solids in water is provided. The process includes collecting paint sludge water into a tank; generating an electrical signal from a bottom of the tank to induce electrokinetic floatation of solids and semi-solids in the paint sludge water to a surface of the tank to separate the solid and semi-solids from the water. After the solids and semi-solids are separated from the water, the process includes removing the solids and semi-solids from the tank.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a diagrammatic view of an electrode system illustrating the process using the electrical signal for electrokinetic floatation of paint sludge according to the principles of the present invention;

FIG. 4 is a perspective view of a sludge tank having an electrode array according to the principles of the present invention.

DETAILED DESCRIPTION OF THE PREFERRED EMBODIMENTS

Figure 1:
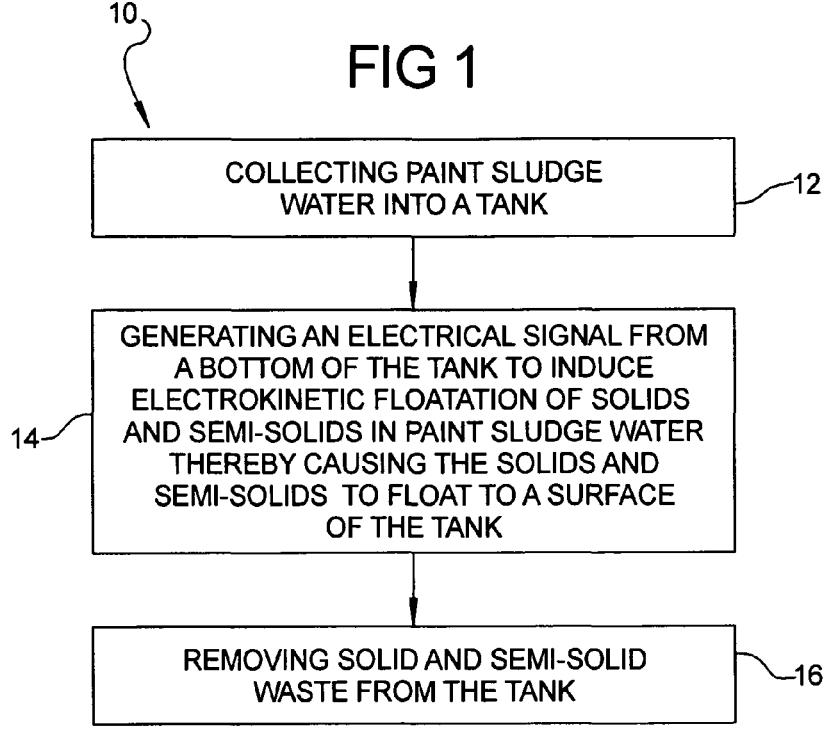
FIG. 1 is a flow chart illustrating a process for electrokinetic floatation of paint sludge using an electrical signal according to the principles of the present invention.

FIG. 1 refers to a process 10 using an electrical signal to generate electrokinetic floatation of solids and semi-solids or paint sludge in paint sludge water regarding automotive manufacturing. The process 10 includes collecting the paint sludge water into a tank at step 12. The process 10 further includes generating the electrical signal from an electrode system on the bottom of the tank to induce electrokinetic floatation of solids and semi-solids in the paint sludge water to a surface of the tank to separate from the water, at step 14. After separating the solids and semi-solids from the water, the process 10 includes removing the solids and semi-solids from the tank at step 16.

FIG. 2 depicts an electrode system 20 for implementing the process for electrokinetic floatation of solids and semi-solids 35 using low voltage dc current. The system 20 includes a mixing tank 22, a pipe 24, a sludge tank 26, an electrode array 28, a recirculation pump 30, and a paint sludge removal system 32.

The mixing tank 22 is coupled to one end of the pipe 24. The other end of the pipe 24 is coupled to one end 26a of the sludge tank 26. The electrode array 28 is located and positioned on the bottom 26b of the sludge tank 26. An opposite and opposing end 26c of the sludge tank 26 is coupled to the paint sludge removal system 32 and the recirculation pump 30.

The mixing tank 22 is adaptable for receiving water 34 and capturing any excess paint 36 produced during a painting process. For example, the painting process may include painting a vehicle, where the mixing tank 22 is located beneath a vehicle 40. As the water 34 and the paint 36 are collected into the mixing tank 22, paint sludge water 38 is formed.

The pipe 24 pumps the paint sludge water 38 into the sludge tank 26. The pipe 24 extends over a width of the sludge tank 26 and is configured to release the paint sludge water 38 in equal distributions over the width of the sludge tank 26. Additionally, the pipe 24 releases the paint sludge water 38 at one end 26a of the sludge tank 26.

Figure 3:
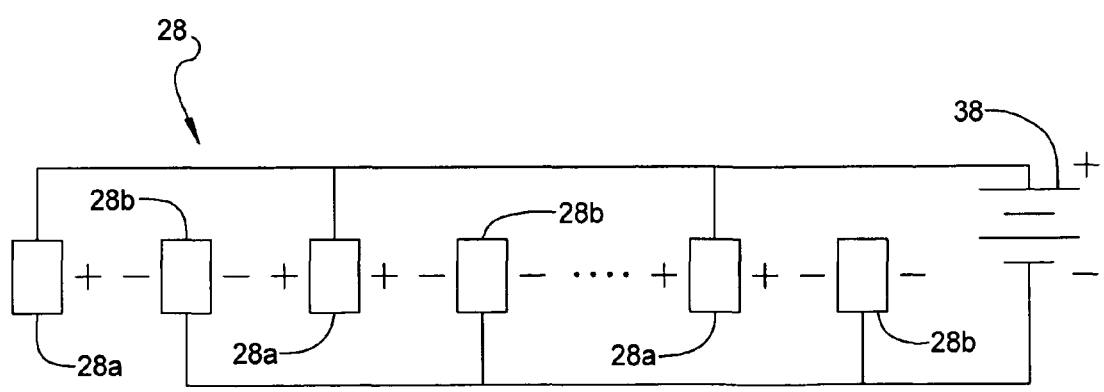
FIG. 3 is a diagrammatic view of an electrode array used in the electrode system according to the principles of the present invention.

Referring to FIGS. 2-4, located at the bottom 26b of the sludge tank 26 and immersed in the paint sludge water 38 is an electrode array 28. More specifically, the electrode array 28 extends across the width of the bottom 26b of the sludge tank 26 near the one end 26a of the sludge tank 26 (FIG. 4). The electrode array 28 includes a plurality of electrodes, each serving as either a cathode 28a or an anode 28b such that the cathode 28a is placed consecutively adjacent to the anode 28b. Additionally, each electrode 28 is positioned a specific distance d from neighboring electrodes along the width w of the sludge tank 26 (FIG. 4). Each electrode of the electrode array 28 is made of a non-corrosive and conductive material, such as graphite, for example.

The plurality of electrodes is coupled to an external source 38 of electricity having a positive terminal and a negative terminal, such as a dc power supply. The cathodes 28a are coupled to the negative terminal of the external source 38; and the anodes 28b are coupled to the positive terminal of the external source 38, as shown for exemplary purposes only in FIG. 3. In order to prolong a service life of each electrode and minimize deterioration of each anode 28b, a polarity of each electrode may be reversed by switching a terminal connection of each electrode from the positive terminal to the negative terminal or vice versa at a predetermined cycle time.

The electrode array 28 emits an electrical signal, such as a low voltage dc current. The electrical signal is produced across the width w of the sludge tank 26. The electrical signal induces electrokinetic floatation of the solids and semi-solids 35 in the paint sludge water 38, wherein the solids and semi-solids 35 separate from the water 34 and rise to a top surface in the sludge tank 26 for further dewatering. The electrical signal required to generate effective floatation of the solids and semi-solids 35 is proportional to the quantity of the solids and semi-solids 35 in the paint sludge water 38 and flow rate of the paint sludge water 38 in the sludge tank 26.

The paint sludge removal system 32 removes floating solids and semi-solids 35 from the sludge tank 26. The paint sludge removal system 32 pumps the floating solids and semi-solids 35 from the other end 26c of the sludge tank 26. Additionally, the recirculation pump 30 pumps the water 34 from the sludge tank back into the mixing tank 22 for recirculation and reuse.

The actions of pumping the solids and semi-solids 35 and the water 34 from the sludge tank 26, produces a dynamic flow system that causes the paint sludge water 38 to flow from the one end 26a of the sludge tank 26 to the other end 26c of the sludge tank 26. This allows the system 20 to separate the water 34 from the solids and semi-solids 35 near the one end 26a of the sludge tank 26 and remove the solids and semi-solids 35 at the other end 26c of the sludge tank 26.

For exemplary purposes only, the following operational example is provided. Referring to FIGS. 2 and 3, a vehicle 40 is transported Into a painting chamber 42. While in the painting chamber 42, the vehicle 40 is sprayed with the paint 36. During this painting operation, excess paint 36 falls into the mixing tank 22 filled with circulating water 34 causing the paint sludge water 38 to form. The paint sludge water 38 is then pumped into the pipe 24 and transported into the one end 26a of the sludge tank 26. The paint sludge water flows along a length L of the sludge tank 26 in the direction f as shown in FIG. 2.

During this flowing process, the paint sludge water 38 travels across the electrode array 28. The electrical signal and an electric field are generated from the electrode array 28. This causes electrochemical and electromagnetic reactions at both the cathodes 28a and the anodes 28b.

The electrochemical reactions induced by the electric signal include reductions at the cathodes 28a and oxidations at the anodes 28b. At each cathode 28a, electrons flow down into each electrode and react with cations, producing a chemical change. The water 34 of the paint sludge water 38 takes up one electron and splits up to give atoms of hydrogen, which combine to give molecules of hydrogen gas, leaving hydroxyl anions in the paint sludge water 38.

The oxidation reactions occur at each anode 28b, wherein the water 34 is split up giving hydrogen electrons and producing molecules of oxygen gas. As the hydrogen gas and the oxygen gas are formed, gas bubbles are produced in the paint sludge water 38 and rise to the surface of the sludge tank 26. If chlorine is present in the water 34, chlorine gas molecules are also produced at each anode 28 and give off bubbles. As the gas bubbles float upward, the solids and semi-solids 35 are separated from the water 34. More specifically, the gas bubbles cause the solids and semi-solids 35 of the paint sludge water 38 to float to the surface in the sludge tank 26.

An additional aid in the electrokinetic floatation of the solids and semi-solids 35 is the electric field. In the paint sludge water 38, suspended solids or semi-solids 35 carry negative electric charges. The solids and semi-solids 35 are subjected to electrophoretic and dielectrophoretic forces induced by the electric field. These forces aid in driving the solids and semi-solids 35 away from the electrode array 28 installed on the bottom of the sludge tank 26.

Once the solids and semi-solids 35 are separated from water 34, the paint sludge removal system 32 removes the solids and semi-solids 35. The paint sludge removal system 32 guides floating solids and semi-solids 35 into a waste pump (not shown) that removes the solids and semi-solids 35 from the sludge tank 26. Additionally, the recirculation pump 30 recirculates the water 34 back into the mixing tank 22.

The process 10 and system 20 for using an electrical signal to remove solids and semi-solids 35 of paint sludge water 38 from the water disclosed is advantageous because it is cost effective and less hazardous than using chemicals to produce the same or greater results.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process for using an electrical signal to cause electrokinetic floatation of solids and semi-solids in paint sludge water, the process comprising:

collecting the paint sludge water into a tank via a pipe extending across a width of the tank at an input end thereof and configured to release the paint sludge water in substantially even amounts over the width of the tank;

generating the electrical signal from a bottom of the tank to separate the solids and semi-solids from water in the paint sludge water to induce electrokinetic floatation of the solids and semi-solids to a top surface of the paint sludge water; and removing the solids and semi-solids from the tank.

2. The process of claim 1, wherein the electrical signal comprises a low voltage dc current.

3. The process of claim 1, further comprising:

producing a dynamic flow system such that the paint sludge water travels over a length of the tank.

4. The process of claim 1, wherein producing the electrical signal further comprises:

producing the electrical signal across a width of the tank.

5. The process of claim 4, further comprising:

producing gas bubbles using the electrical signal to cause the solids and semi-solids to float to the top surface as the paint sludge water flows across the electrical signal.

6. The process of claim 1, further comprising:

removing the water from the tank after the solids and semi-solids have been separated from the water.

7. The process of claim 6, further comprising:

generating an electric field using the electrical signal to induce electromagnetic forces to cause the solids and semi-solids to float away from the bottom of the tank and towards the top surface of the paint sludge water.

8. The process of claim 1, wherein producing the electrical signal further comprises:

producing the electrical signal from an electrode system about the bottom of the tank.

9. An electrode system for electrokinetic floatation of solids and semi-solids in paint sludge water using low voltage dc current, the electrode system comprising;

a mixing tank adaptable for collecting the paint sludge water;

a sludge tank coupled to the mixing tank for receiving the paint sludge water via a pipe extending across a width of the sludge tank at an input end thereof and configured to release the paint sludge water in substantially evenly distributed amounts over the width of the sludge tank, wherein the sludge tank includes an electrode array operable to emit the low voltage dc current across a bottom of the sludge tank to separate the solids and semi-solids from water by inducing the electrokinetic floatation of the solids and semi-solids in the paint sludge, water; and a paint sludge removal system coupled to the sludge tank and adapted to remove the solids and semi-solids from the sludge tank.

10. The electrode system of claim 9, further including a pump coupled to the sludge tank and adapted to remove the paint sludge water from the sludge tank.

11. The electrode system of claim 9, wherein the paint sludge water flows across a length of the sludge tank.

12. The electrode system of claim 9, wherein the electrode array is positioned across a width of the sludge tank.

13. The electrode system of claim 12, wherein the solids and semi-solids float to a top surface of the paint sludge water as the paint sludge water flows over the electrode array.

14. The electrode system of claim 9, wherein the electrode array comprises a first electrode having a polarity of a negative charge and a second electrode having a polarity of a positive charge.

15. The electrode system of claim 14, wherein the polarity of the first and second electrodes is reversed at a predetermined time.

16. The electrode system of claim 14, wherein the plurality of electrodes are positioned equidistantly from one another along a width of the sludge tank.

17. The electrode system of claim 9, wherein the electrode array emits the low voltage dc current in the paint sludge water to cause electrochemical reactions to produce gas bubbles.

18. The electrode system of claim 17, wherein the gas bubbles cause the solids and semi-solids to float to a top surface of the paint sludge water.

19. The electrode system of claim 9, wherein the low voltage dc current generates electromagnetic forces to induce the solids and semi-solids to float away from the electrode array towards the surface of the paint sludge water.

\* \* \* \* \*